US006895830B2

(12) United States Patent
Kochersberger et al.

(10) Patent No.: US 6,895,830 B2
(45) Date of Patent: May 24, 2005

(54) SYSTEM AND METHOD FOR TESTING LINKAGES

(75) Inventors: Kevin B. Kochersberger, Honeoye Falls, NY (US); Gregory J. Kacprzynski, East Rochester, NY (US); William Morris, Oakfield, NY (US); Joshua R. Eckler, Huntington Beach, CA (US)

(73) Assignee: Rochester Institute of Technology, Rochester, NY (US)

( * ) Notice: Subject to any disclaimer, the term of this patent is extended or adjusted under 35 U.S.C. 154(b) by 24 days.

(21) Appl. No.: 10/116,630

(22) Filed: Apr. 4, 2002

(65) Prior Publication Data

US 2002/0171555 A1 Nov. 21, 2002

Related U.S. Application Data

(60) Provisional application No. 60/281,858, filed on Apr. 5, 2001.

(51) Int. Cl.$^7$ .......................... G01M 13/00; G01M 19/00
(52) U.S. Cl. .......................... 73/865.9; 73/801; 73/847; 73/587; 73/593; 340/679
(58) Field of Search ....................... 73/865.9, 659–660, 73/801, 847, 587, 593, 814–815, 865.3, 788, 841; 74/DIG. 7; 340/679; 403/27

(56) References Cited

U.S. PATENT DOCUMENTS

| | | | |
|---|---|---|---|
| 3,745,815 A | 7/1973 | Bentone et al. | |
| 3,979,739 A | 9/1976 | Birchall | |
| 4,040,064 A | * 8/1977 | Boucher | 346/72 |
| 4,375,121 A | * 3/1983 | Sigmund | 29/407.02 |
| 4,471,444 A | 9/1984 | Yee et al. | 73/104 X |
| 4,592,125 A | * 6/1986 | Skene | 29/407.03 |
| 4,988,979 A | 1/1991 | Sasaki et al. | 340/683 |
| 5,081,873 A | 1/1992 | Kikuchi et al. | 73/865.9 |
| 5,542,303 A | * 8/1996 | Neuffer | 73/863.23 |
| 5,565,623 A | 10/1996 | Philpott et al. | 73/105 |
| 5,576,496 A | 11/1996 | Carlini et al. | 73/490 |
| 5,767,648 A | 6/1998 | Morel et al. | 318/568.1 |
| 5,995,910 A | 11/1999 | Discenzo | 752/56 |
| 6,138,493 A | 10/2000 | Zeitlin | 73/1.01 |
| 6,378,374 B2 | 4/2002 | Kochersberger | 73/593 |
| 6,646,405 B2 | * 11/2003 | McConnell et al. | 318/568.2 |
| 2001/0042409 A1 | 11/2001 | Kocherberger | 73/593 |

OTHER PUBLICATIONS

U.S. Appl. No. 60/205,183.*

* cited by examiner

*Primary Examiner*—Thomas P. Noland
(74) *Attorney, Agent, or Firm*—Nixon Peabody LLP (57) ABSTRACT

A system and method for testing at least one joint in a linkage includes a platform system, a torque system, an articulation assembly and a fault detection system. The platform system receives a first shaft connected to a first joint in the linkage and the torque system applies torque to the first joint without substantially rotating the first shaft or joint, a second shaft connected to a second joint in the linkage or the second joint. The articulation assembly receives the second shaft and moves the second joint in a substantially circular path without substantially rotating the first shaft or joint and the second shaft or joint. The fault detection system determines the condition of the linkage based upon detected signals emitted from the linkage while the first joint is torqued and the second joint is moved.

44 Claims, 5 Drawing Sheets

SYSTEM AND METHOD FOR TESTING LINKAGES

This application claims the benefit of U.S. Provisional Patent Application Ser. No. 60/281,858, filed on Apr. 5, 2001, which is herein incorporated by reference.

FIELD OF THE INVENTION

The present invention relates generally to testing systems and methods and, more particularly, to a system and method for testing linkages to determine whether they are defective or damaged.

BACKGROUND OF THE INVENTION

Constant velocity ("CV") joints are frequently used in the automotive industry and particularly in front-wheel drive vehicles, although these joints may be used in a number of other applications. One CV joint is typically connected to each end of an axle to form a CV joint—axle—CV joint combination or linkage commonly referred to as a "half shaft." One end of the half shaft connects to a transmission output flange and the opposite end connects to the wheel axle. This linkage allows the wheel to move vertically through its range of suspension travel and allows a steering angle to be applied while the wheel rotates.

Figure 1:
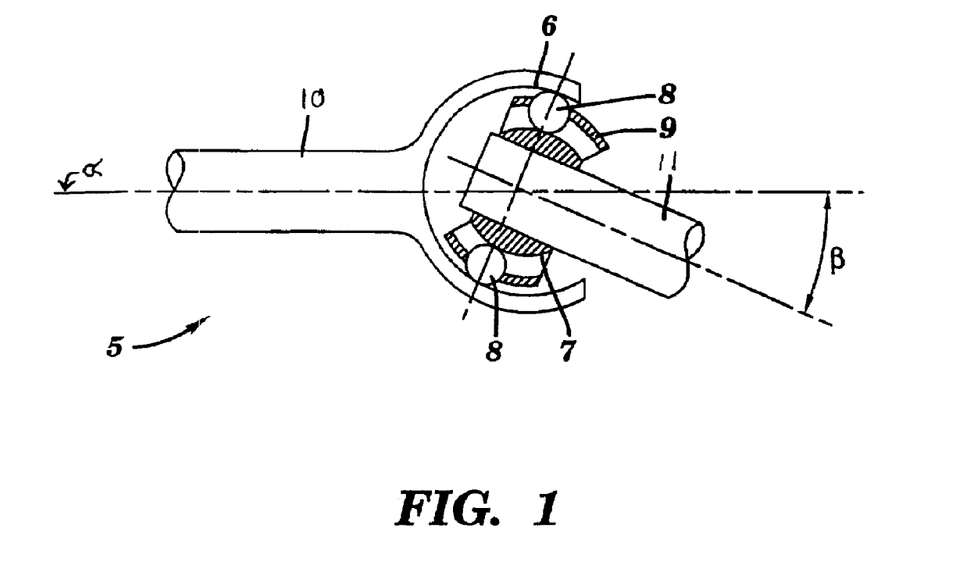
FIG. 1 is a cross-sectional diagram of a conventional CV joint.

Referring to FIG. 1, a typical "Rzeppa" bell-type constant velocity ("CV") joint 5 is illustrated. The joint 5 includes an outer race 6, an inner race 7, ball bearings 8 and a cage 9 that holds the balls 8 in place within the joint 5. A load bearing input shaft 10 is connected to the outer race 6, although the input shaft 10 may instead be connected to the inner race 7. An output shaft 11 is connected to the inner race 7, although the output shaft 11 may instead be connected to the outer race 6 if the input shaft 10 is not connected to the outer race 6. Although only two balls 8 are shown, these joints 5 often have six or more balls 8. Additionally, the outer and inner races 6, 7 have corresponding partially spherical grooves.

The joint 5 transfers input torque applied on the input shaft 10 to the output shaft 11 as output torque despite the output shaft 11 moving or articulating over a range of β angles with respect to an α axis. The grooves formed in the outer and inner races 6,7 guide balls 8 as they move in an axial direction along a partially spherical path formed between the races 6,7 and bisected by the α axis. This enables the input torque to be transferred through the balls 8 to the output shaft 11 while the shaft is articulated over the β angles.

Joint 5 is susceptible to defects or damage during its original manufacture or subsequent remanufacture, or from impacts caused by vehicle collisions or normal operational wear. Typically, the damage involves a scoring or failure of the surfaces of outer race 6, inner race 7 or ball bearings 8. The contact between the rough surfaces of balls 8 or races 6,7 causes a vibration-induced noise to be emitted from the joint 5 during operation. The noise is an indication of the high stresses and heat that may eventually lead to a catastrophic failure of joint 5. Thus, the noise emitted from joint 5 can provide a reliable indication of joint 5 health and is tantamount to detecting damage. See "A Study of Signature Analysis Regarding A Rzeppa Type Constant Velocity Joint," R. Dunn, Master Thesis, Rochester Institute of Technology, 2000, which is herein incorporated by reference in its entirety.

Conventional devices that may be used for determining whether joint 5 is defective or damaged require the input or output shafts 10,11 to be completely rotated while being moved around to replicate the operating conditions of joint 5 when installed in a vehicle. Unfortunately, these devices expend high amounts of energy to sustain the rotation of input or output shafts 10,11, and the high torque loads used by these devices are not easy to accurately control, compounding the difficulty of obtaining accurate data about the joint 5. Additionally, the rotation of input or output shafts 10,11 generates mechanical and electrical noise that can interfere with detecting signals that might otherwise be useful for evaluating the joint 5. Further, completely rotating input or output shafts 10,11 during testing makes placing sensors on the joint 5 difficult, requiring the use of non-contacting sensors such as telemetry or slip rings to further complicate obtaining data about the joint 5.

SUMMARY OF THE INVENTION

A system in accordance with one embodiment of the present invention includes a platform system having a first mount that receives a first end of a linkage, a torque system coupled to the first mount that applies torque to the first end of the linkage without substantially rotating the first end or a second end of the linkage, an articulation assembly having a second mount that receives the second end of the linkage, the articulation assembly moving the second end along a substantially circular path without substantially rotating the first or second ends of the linkage, and a fault detection system that determines one or more conditions of the linkage based upon one or more detected signals emitted from the linkage while the first end is torqued and the second end is moved.

A system for testing a linkage for defects in accordance with one embodiment of the present invention includes a platform system having a first mount that receives a first end of a linkage, a torque system coupled to the first mount that applies torque to the first end of the linkage without substantially rotating the first end or a second end of the linkage, one or more first articulation members coupled to a drive mechanism, the first articulation members substantially aligned along a first member plane, the first articulation members being substantially symmetrical with respect to each other, a second articulation member coupled at a first end to one of the first articulation members, coupled at a second end to another one of the first articulation members and coupled at a substantially center portion to a second mount that receives the second end of the linkage, the second articulation member substantially aligned along a second member plane, the drive mechanism operating to move the second end of the linkage along a substantially circular path without substantially rotating the first or second ends of the linkage, and a fault detection system that determines one or more conditions of the linkage based upon one or more detected signals emitted from the linkage while the first end is torqued and the second end is moved.

A method in accordance with one embodiment of the present invention includes receiving a first end of a linkage at a first mount, applying torque to the first end of the linkage without substantially rotating the first end or a second end of the linkage, receiving the second end of the linkage at a second mount, moving the second end along a substantially circular path without substantially rotating the first or second ends of the linkage, and determining one or more conditions of the linkage based upon one or more detected signals emitted from the linkage while the first end is torqued and the second end is moved.

A method for testing a linkage for defects in accordance with one embodiment of the present invention includes receiving a first end of a linkage at a first mount, applying torque to the first end of the linkage without substantially rotating the first end or a second end of the linkage, receiving the second end of the linkage at a second mount, rotating one or more first articulation members that are substantially aligned along a first member plane, are substantially symmetrical with respect to each other and are coupled to a second articulation member that is coupled at a substantially center portion to the second mount and is substantially aligned along a second member plane to move the second end of the linkage along a substantially circular path without substantially rotating the first or second ends of the linkage, and determining one or more conditions of the linkage based upon one or more detected signals emitted from the linkage while the first end is torqued and the second end is moved.

The present invention provides a number of advantages including providing a testing system and method that can easily be used to accurately, reliably, inexpensively and effectively quantify the condition of CV joints or other types of linkages without damaging the joints.

Further, the present invention provides a testing system and method that can effectively quantify the condition of a CV-joint to determine if it is salvageable, scrap, or within operating specifications. The present invention can also be used to test new or remanufactured CV-joints.

One of the features of the present invention is the articulation of the CV joint through its full range of motion without a complete rotation of the shafts connected to the CV joint. By eliminating the rotation, the detection instrumentation or sensors may be placed directly on the CV joint. This enables the sensors to more accurately capture signals used to evaluate the condition of the CV joint. The elimination of the rotation of the shafts also eliminates the background noise associated with this motion which further enhances the ability of the detection instrumentation or sensors to pick up the signals of interest. Further, the power requirements are reduced because power is only needed to articulate, not rotate the shafts connected to the CV joint.

Another feature of the present invention is more accurate torque control. The present invention applies torque while articulating CV-joints in a controlled environment. This capability, when coupled with the speed of the articulation and the velocity, acceleration or acoustic data, is used to determine various faults, quality of a joint, and the life of a CV joint through accelerated wear testing. With the present invention, substantially none of the torque applied to the CV joint is transferred to the drive system. Therefore, the drive motor and drive system may be kept small and inexpensive.

Further, the present invention can be adjusted to accommodate the size requirements and range of motion requirements for a variety of different types of joints. With these adjustments, any CV joint or linkage can be put through its full range of motion so that all race and ball defects may be realized.

DETAILED DESCRIPTION OF THE INVENTION

Figure 2:
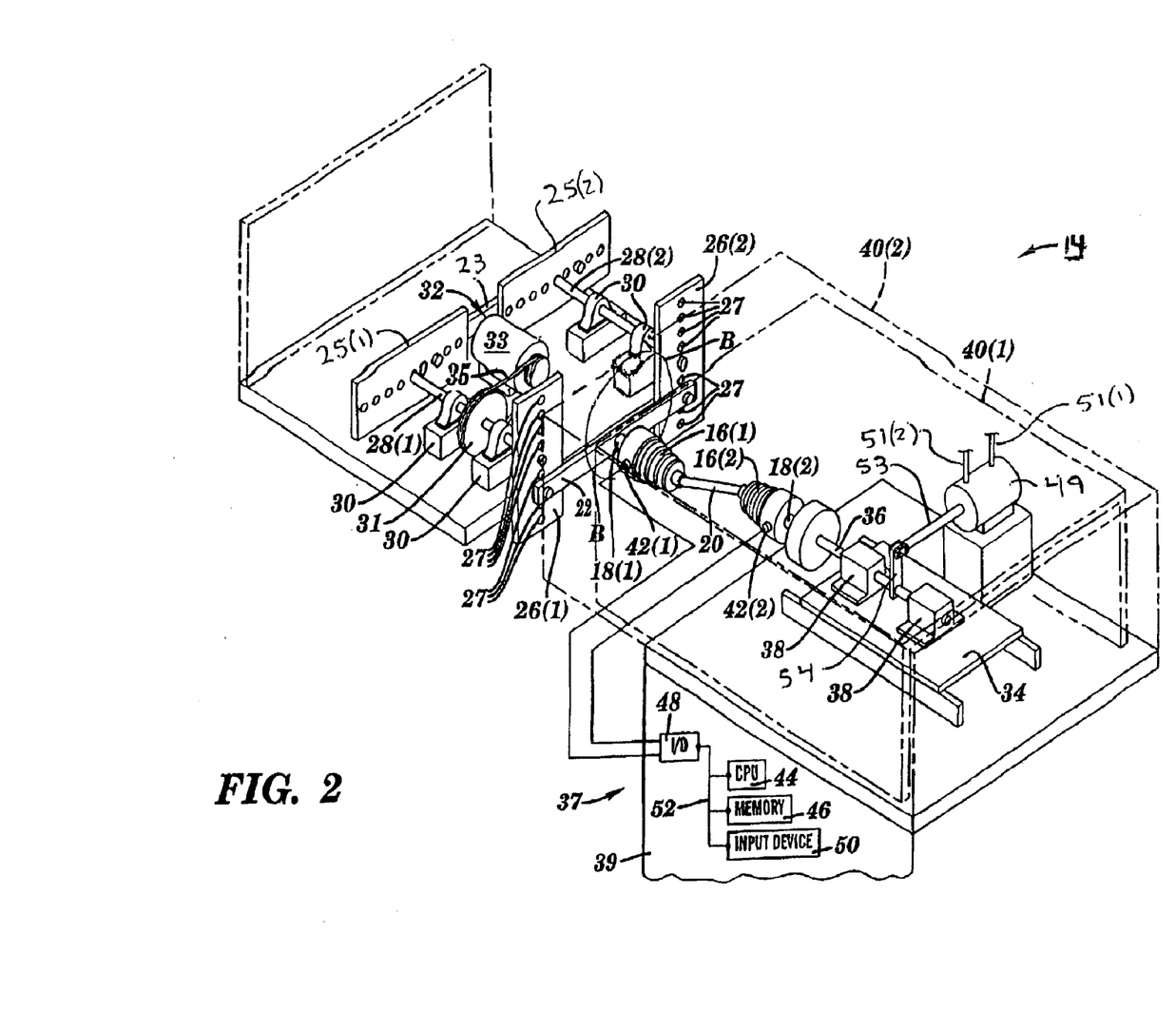
FIG. 2 is a perspective view of an apparatus for testing the CV joint shown in FIG. 2.
Figure 3:
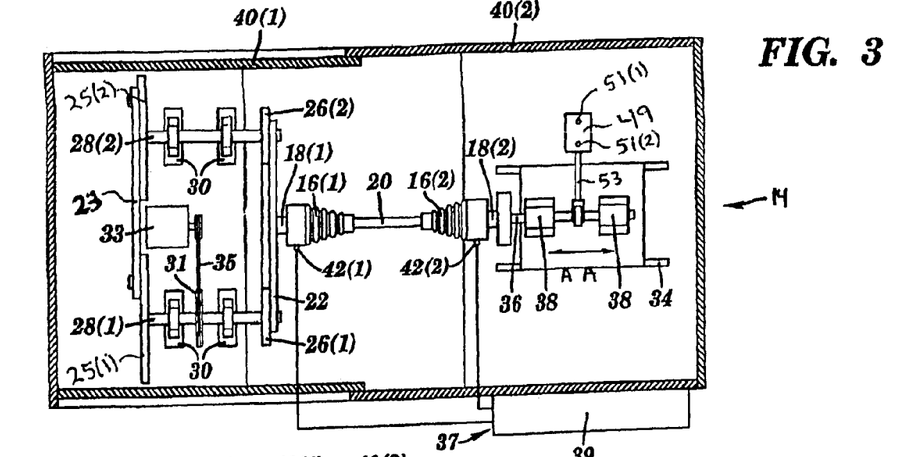
FIG. 3 is a partial cross-sectional top view of the apparatus shown in FIG. 2.
Figure 4:
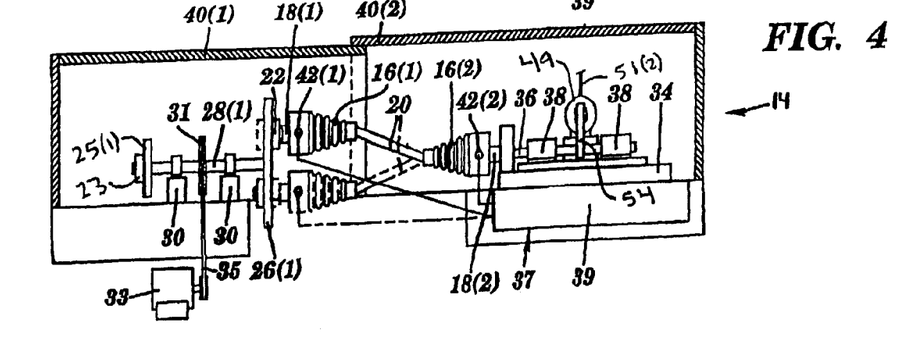
FIG. 4 is a partial cross-sectional side view of the apparatus shown in FIG. 2.
Figure 5:
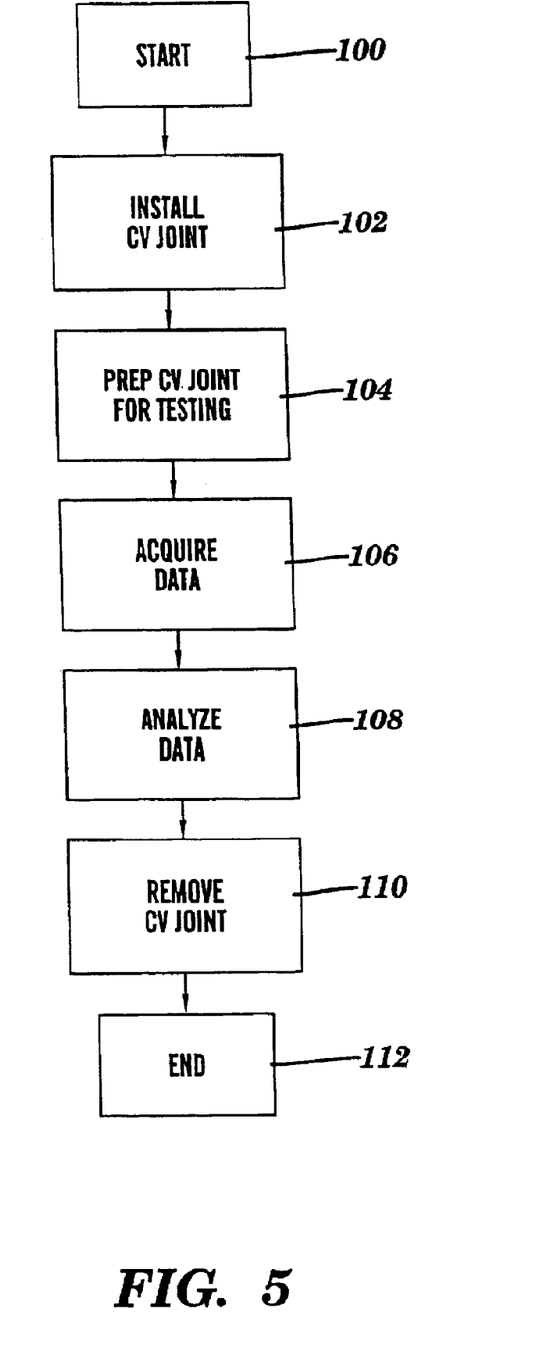
FIG. 5 is a flow chart of a method for testing a CV joint in accordance with another embodiment of the present invention.

A testing system 14 for determining whether CV joints 16(1)–16(2) are defective in accordance with one embodiment of the present invention is illustrated in FIGS. 2–4. The testing system 14 includes a platform system, a torque system, an articulation assembly, and a fault detection system, and the method includes receiving a first end of a linkage (i.e., CV joints 16(1)–16(2), shafts 18(1)–18(2) and drive shaft 20) at a first mount, applying torque to the first end of the linkage without substantially rotating the first end or a second end of the linkage, receiving the second end of the linkage at a second mount, moving the second end along a substantially circular path without substantially rotating the first or second ends of the linkage, and determining one or more conditions of the linkage based upon one or more detected signals emitted from the linkage while the first end is torqued and the second end is moved. The present invention provides a number of advantages including providing a testing system 14 and method that can easily be used to accurately, reliably, inexpensively and effectively quantify the condition of CV-joints 16(1)–16(2) without damaging CV joints 16(1)–16(2) or shaft s 18(1)–18(2).

Referring to FIGS. 2–4, in this particular embodiment a pair of CV joints 16(1)–16(2) are tested, although the system 14 can be used to test other types and a fewer or greater number of joints 16(1)–16(2). In this example, the CV joints 16(1)–16(2) being tested each have their own load bearing shaft 18(1)–18(2) and share a common drive shaft 20, although a joint or joints 16(1)–16(2) with other configurations can also be tested.

In this particular embodiment, the testing system 14 includes a drive link 22, a support link 23, a pair of plates 25(1)–25(2), a pair of cranks 26(1)–26(2), a pair of articulation shafts 28(1)–28(2) and rotational supports 30, a driving system 32, a movable block 34, a block shaft 36, rotation supports 38, a nested housing 40(1)–40(2), an air cylinder 49, a rod 53, and a lever 54. Although one example of a testing system 14 is shown, a variety of different types of testing systems 14 can be used that can articulate the joint or joints 16(1)–16(2) being tested without or with little substantial rotation of the shafts 18(1)–18(2) and 20 connected to the joint or joints 16(1)–16(2).

The drive link 22 is connected between two cranks 26(1)–26(2). One end of a load bearing shaft 18(1) for one of the CV joints 16(1) is connected to the substantial center of the drive link 22. During testing, the drive link 22 is moved in a substantially circular path identified by the arrow B in FIG. 2, which articulates or moves the load bearing shaft 18(1), and thus the CV joint 16(1), without substantially rotating the load bearing shaft 18(1) or the drive shaft 20 of the CV joint 16(1).

Each of the cranks 26(1)–26(2) has one or more apertures 27. In this example, the cranks 26(1)–26(2) are symmetrical for balancing purposes, although they do not have to be symmetrical. The ends of the drive link 22 are connected to the cranks 26(1)–26(2) via bolts or other securing devices that extend through one of the apertures 27 in each of the cranks 26(1)–26(2). Depending on the particular aperture 27 selected, the drive link 22 can be positioned a variety of distances away from the center of the cranks 26(1)–26(2). As a result, the range of motion to be applied to the CV joints 16(1)–16(2) during testing can be adjusted to the particular CV joint or joints 16(1)–16(2) being tested. Different joints 16(1)–16(2) have different testing requirements in terms of the range of motion.

The articulation shafts 28(1)–28(2) are rotatably seated within rotational supports 30 in the housing 40(1)–40(2). One end of each of the articulation shafts 28(1)–28(2) is connected to one of the cranks 26(1)–26(2). When the articulation shafts 28(1)–28(2) are rotated, the cranks 26(1)–26(2) connected to the articulation shafts 28(1)–28(2) rotate and translate this motion to the drive link 22.

Each of the plates 25(1)–25(2) are secured to another end of the articulation shafts 28(1)–28(2) and are offset from the position of the cranks 26(1)–26(2) by about ninety degrees in this example. A support link 23 is connected between the plates 25(1)–25(2). The support link 23 absorbs the torque at this end of the system 14.

The driving system 32 is connected to one of the articulation shafts 28(1). In this particular embodiment, the driving system 32 includes a motor 33 that is coupled to one of the articulation shafts 28(1) via a belt 35 and a drive pulley 31 rotatably seated on the articulation shaft 28(1), although a variety of different types of driving systems can be used. When the driving system 32 is engaged, the system 32 rotates the articulation shaft 28(1) that in turn rotates the cranks 26(1)–26(2). One of the features of the present invention is that a low power motor 33 may be used because rotation of the shafts 18(1)–18(2), 20 and the CV joints 16(1)–16(2) is unnecessary for testing purposes. The use of a low power motor 33 reduces noise and is highly desirable because the signals related to damage that are being monitored for and detected are small. In this example, the motor 33 comprises a one horsepower variable speed electric motor, although other types of motorized devices may be used such as hydraulic or pneumatic motors.

The movable block 34 is seated on one or more tracks in the housing 40(1)–40(2). The position of the movable block 34 on the tracks of the housing 40(1)–40(2) can be adjusted in the direction indicated by arrows A—A to accommodate the CV joint or joints 16(1)–16(2) with different lengths of shafts 18(1)–18(2) and 20. One end of the load bearing shaft 18(2) for the CV joint 16(2) is also coupled to a block shaft 36 on the movable block 34. A variety of different mechanisms can be used to couple the end of the load bearing shaft 18(2) for the CV joint 16(2) to the block shaft 36. The block shaft 36 is rotatably mounted on rotational supports 38 on the movable block 34, and is coupled to the load bearing shaft 18(2) via the block shaft 36.

The air cylinder 49 comprises a motor assembly that receives and discharges air via air hoses 51(1)–51(2), causing the rod 53 to move into and out from the air cylinder 49. The lever 54 is pivotally connected at one end to the rod 53 and is connected at the other end to block shaft 36. The motion of rod 53 into and out of air cylinder 49 moves lever 54. The movement of lever 54 moves block shaft 36, which imparts a torque to the joints 16(1)–16(2) via block shaft 36. In this example, the air cylinder 49 can generate and impart a substantially constant torque of up to about 300 ft-lbs, although a lesser or greater amount of torque may be generated by the cylinder 49 depending upon the type of air cylinder 49 used and the particular requirements for the joints 16(1)–16(2) being tested. Although one embodiment of a system for imparting torque on the joints 16(1)–16(2) is illustrated, a number of other systems and arrangements including electric and hydraulic motor assemblies or elastic members (e.g., springs, rubber bands, etc.), for example, may be used in place of or in addition to the air cylinder 49 for imparting torque on the block shaft 36, and hence joints 16(1)–16(2).

An optional nested housing 40(1)–40(2) is positioned over the testing system 14. In this particular embodiment, the nested housing has two portions 40(1)–40(2), although the housing 40(1)–40(2) may comprise fewer or more sections. The nested housing 40(1)–40(2) can be moved to cover or expose the CV joint or joints 16(1)–16(2) in this example being tested and the testing system 14. The housing 40(1)–40(2) is typically closed for safety reasons. Closing the housing 40(1)–40(2) may also help to keep out extraneous noises that might be picked up by the sensors on the CV joint or joints 16(1)–16(2) and that might effect the quality of the evaluation.

In this particular embodiment, the detection system 37 includes a detection processing system 39 and sensors 42(1)–42(2) for each of the CV joints 16(1)–16(2). Although one example of a detection system 37 is shown, a variety of different types of detection systems 37 that can obtain signals from a CV joint 16(1) or 16(2) as it is being articulated and that can process those signals to evaluate the CV joint 16(1) or 16(2) can be used.

In this particular embodiment, each sensor 42(1)–42(2) may comprise an accelerometer used to measure the defect-induced vibration, although other types of sensors that can detect signals during the articulation of the CV joint or joints 16(1)–16(2) as described herein may be used including audio sensors (e.g., microphones). Since the joints 16(1)–16(2) are not rotating, the sensor 42(1)–42(2) can be directly mounted to the joints 16(1)–16(2). This eliminates the need for special equipment, such as slip rings or telemetry, required by prior testing devices where the joint is rotated. Eliminating this special equipment lowers the overall cost of system 14 and also reduces the chance of contaminating the detected signal from the CV joint with non-damage related noise. Additionally, the direct mounting on the CV joints 16(1)–16(2) greatly increases the signal-to-noise ratio. As a result, most, if not all, damage-induced vibration will be detected by the sensor and very little background noise will be detected. Multiple sensors can be mounted on each of the joints 16(1)–16(2) to obtain position-dependent information.

The detection processing system 39 includes a processor or central processing unit ("CPU") 44, a memory 46, an input/output interface 48, and a user input device 50 that are coupled together by a bus system 52 or other link, although the detection processing system 39 may comprise other components, other numbers of the components, and other combinations of the components. The processor 44 executes a program of stored instructions for the method for testing or evaluating at least one joint 16(1)–16(2) in accordance with one embodiment of the present invention as described herein and in FIG. 6. In this particular embodiment, those programmed instructions are stored in memory 46, although some or all could be stored and retrieved from other locations. A variety of different types of memory storage devices, such as a random access memory ("RAM") or a read only memory ("ROM") in the system 39 or a floppy disk, hard disk, CD ROM, or other computer readable medium that is read from and/or written to by a magnetic, optical, or other reading and/or writing system that is coupled to the processor 44, can be used for memory 46. The input/output interface 48 is used to operatively couple and communicate between the detection processing system 39 and sensors 42(1)–42(2). In this particular embodiment, the connection is shown as a hard wire connection, although a variety of different types of connections and communication techniques can be used to transmit signals from the sensors 42(1) and/or 42(2) to the detection processing system 39 and/or from the detection processing system 39 to the sensors 42(1) and/or 42(2). The user input device 50 enables an operator to generate and transmit signals or commands to the processor. A variety of different types of user input devices can be used, such as a keyboard or computer mouse.

The operation of the system 14 for testing CV joints 16(1)–16(2) will be described with reference to FIGS. 2–5. In step 100, a method for testing at least one joint, such as a CV joint, in accordance with one embodiment of the present invention begins. In this particular example, CV joints 16(1)–16(2) with load bearing shafts 18(1)–18(2) and common drive shaft 20 will be tested, although other types and numbers of linkages and joints 16(1)–16(2) can be tested. One of the features of the invention is that multiple joints 16(1)–16(2) can be evaluated at the same time.

Next, in step 102 the CV joints 16(1)–16(2) are installed in the system 14. More specifically, in this particular example the portion 40(1) of the housing is slid or nested back in with the portion 40(2) of the housing to open up the system 14. Next, the location of drive link 22 on the cranks 26(1)–26(2) may be adjusted by using different apertures 27 to secure the drive link 22 on the cranks 26(1)–26(2). Adjusting the location of the drive link 22 changes the articulation angle at which a particular joint or joints may be tested at so that each joint can be tested through its full range of motion.

Continuing in step 102, block 34 may be adjusted along the tracks in the direction of arrows A to accommodate the particular length of the joint or CV joints 16(1)–16(2) in this example being tested. Once the block 34 is adjusted, load bearing shaft 18(1) is attached to drive link 22 and load bearing shaft 18(2) is coupled to block shaft 36. Next, sensor 42(1) is attached directly to CV joint 16(1) and sensor 42(2) is attached directly to CV joint 16(2).

Next, in step 104 the joints 16(1)–16(2) are prepared for testing by applying torque to the joints 16(1)–16(2). Applying the torque to the joints 16(1)–16(2) can be accomplished in a variety of different ways. In this particular embodiment, torque is applied by turning on air pressure to air cylinder 49 via hose 51(1) or hose 51(2). Drawing air into and out of air cylinder 49 via hoses 51(1) and 51(2), moves rod 53 into and out of air cylinder 49. Movement of rod 53 also moves lever 54 which moves block shaft 36 and applies torque to joint 16(2).

Continuing in step 104, the portion 40(1) of the housing is slid or nested back out from the portion 40(2) of the housing to close the system 14 in this particular example. Once the housing 40 is closed, then the motor 33 is engaged to rotate articulation shaft 28(1) via belt 35 and pulley 31. The rotation of shaft 28(1) rotates the cranks 26(1)–26(2) which rotates the drive link 22 in the a circular path shown by arrows B. The rotation of drive link 22 articulates the load bearing shaft 18(1) of joint 16(1) and of drive shaft 20 of joint 16(2). The testing system 14 does not rotate either of the joints 16(1)–16(2) or the load bearing or drive shafts 18(1), 18(2), or 20. This is advantageous because sensors 42(1)–42(2), such as accelerometers used to measure the defect-induced vibration, can be directly mounted to the joints 16(1)–16(2) without the use of special equipment designed for rotating systems. In this particular embodiment, each of the joints 16(1)–16(2) is articulated through their full range of motion relative to one another without a spinning rotation that would be found during a normal operation.

Next, in step 106 the sensors 42(1)–42(2) detect data or signals emitted from the joints 16(1)–16(2) as the joints 16(1)–16(2) are being articulated. Without a complete rotation, data acquisition to evaluate joints 16(1)–16(2) is greatly simplified. For example, data and signal collection is enhanced by eliminating the complete rotation because the sensors 42(1)–42(2) can be directly mounted on the joints 16(1)–16(2) and the absence of rotation reduces the amount of background noise that may be detected by the sensors 42(1)–42(2). In this particular embodiment, about thirty seconds of data is acquired for each joint 16(1)–16(2), although the amount of data acquired may vary as necessary for the particular application. This data is transmitted from sensors 42(1)–42(2) to detection processing system 39.

Next in step 108 the data or signals detected by sensors 42(1)–42(2) are analyzed to evaluate the joints 16(1)–16(2). By way of example only, detection processing system 39 may conduct a frequency domain analysis of the detected data or signals from joints 16(1)–16(2) during the articulation, which can reveal patterns that are indicative of specific failure modes. In another example, to quantify any damage in a joint 16(1) and/or 16(2), detection processing system 39 may compare the detected signals from each joint 16(1)–16(2) against stored signals that are indicative of damaged and undamaged joints. This technique is commonly referred to as signature analysis. In yet another example, the detection processing system 39 may be programmed to execute instructions to: determine the kurtosis of each of the detected signals: determine how many of the detected signals have a kurtosis which exceeds a threshold level from a source, such as from memory 46 or entered by an operator using input device 50 (the threshold level can be adjusted as needed or desired for the particular application); and then compare the total number of detected signals with a kurtosis that exceeded the threshold level against a set limit also from a source, such as from memory 46 or entered by an operator using input device 50 (the set limit can also be adjusted as needed or desired for the particular application). If the total number exceeds the set limit, then the detection processing system 39 signals that the joint 16(1) and/or 16(2) is bad and if the total number does not exceed the set limit, then the detection processing system 39 signals the joint 16(1) and/or 16(2). The detection processing system 39 may signal the status of each of the tested joints in a variety of different manners, such as on a display screen, printed on a paper in a printer, or stored in memory for retrieval at a later time.

Next, in step 110 the portion 40(1) of the housing is slid or nested back in with the portion 40(2) of the housing to open up the system 14 and the joints 16(1)–16(2) are removed. The above process is then repeated if there is another joint or joints 16(1)–16(2) to be tested. If there is no more testing, then in step 112 the method ends.

Figure 6:
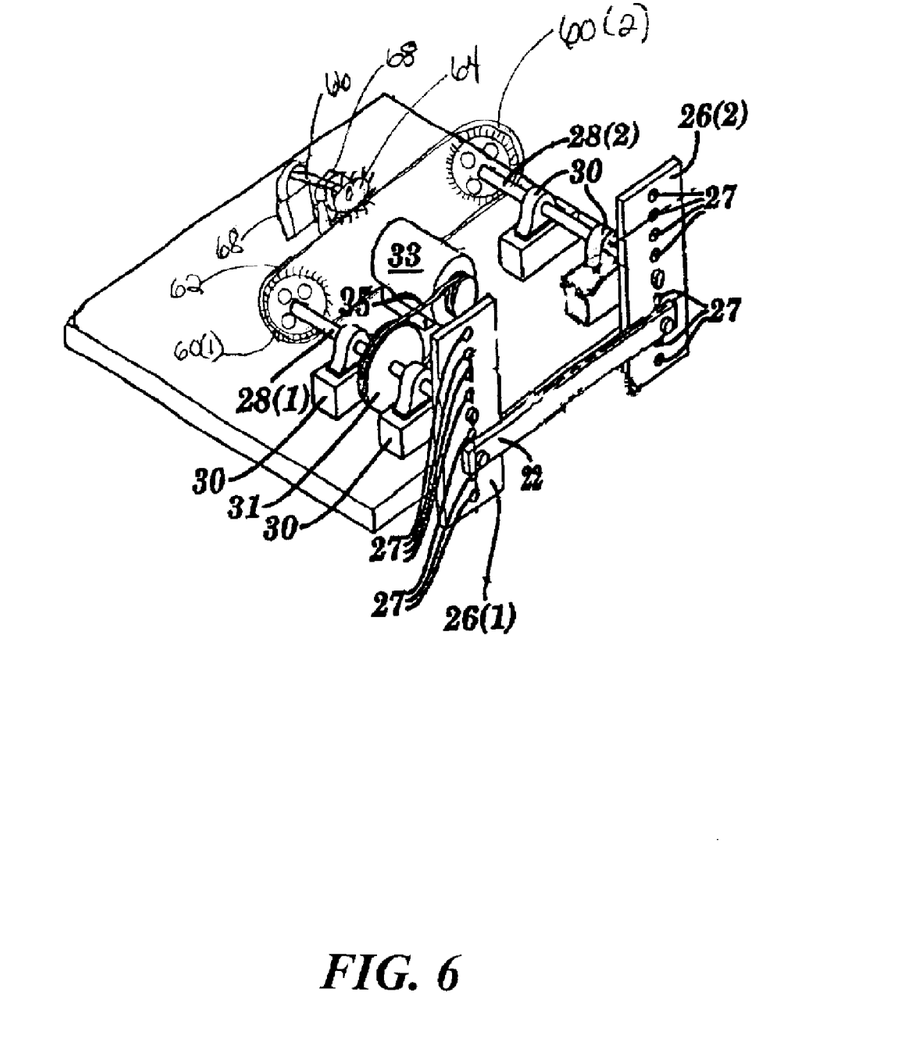
FIG. 6 is a partial perspective view of the apparatus shown in FIG. 2 in accordance with an alternative embodiment.

An alternative embodiment of the testing system 14 for testing CV joints 16(1)–16(2) will now be described. Like reference numbers in FIG. 6 are identical to those in and described with reference to FIGS. 1–5, except in this embodiment, system 14 includes sprocket wheels 60(1)–60(2) and chain 62 substituted for plates 25(1)–25(2) and support link 23.

Each of the sprocket wheels 60(1)–60(2) are secured to the other end of the articulation shafts 28(1)–28(2) opposite the cranks 26(1)–26(2) in this example. The sprocket wheels 60(1)–60(2) may be made of a number of materials including metals, plastics or combinations thereof. Further, the sprocket wheels 60(1)–60(2) may have a number of diameters depending upon the available space within the housing 40(1)–40(2) in testing system 14, for example. However, the diameters of each wheel 60(1)–60(2) should be substantially the same with respect to each other. The chain 62 is secured to each of the sprocket wheels 60(1)–60(2), and operatively connects the sprocket wheels 60(1)–60(2) together by engaging the one or more sprockets or toothlike projections on the outer rim to enable the wheels 60(1)–60(2) to rotate at substantially the same velocity with respect to each other. The chain 62 together with the wheels 60(1)–60(2) rotating at substantially the same velocity help balance and absorb the torque generated by the motor 33 at this end of the system 14.

An optional idler sprocket wheel 64 is connected to an idler shaft 66. The idler shaft 66 is rotatably seated within one or more sprocket wheel supports 68 in the housing 40(1)–40(2). The idler sprocket wheel 64 engages the chain 62 to apply a sufficient amount of tension for keeping the chain 62 taut. Although one alternative embodiment of system 14 is illustrated and described above, a number of other systems and arrangements may be used in place of or in addition to the sprocket wheels 60(1)–60(2), chain 62 and the idler sprocket wheel 64 for absorbing and balancing torque. For example, pulleys may be used in place of sprocket wheels 60(1)–60(2), and a belt with sufficient tension may be used in place of the chain 62 so long as the belt engages the pulleys to enable them to rotate at substantially the same velocity for balancing and absorbing the torque generated by the motor 33 at this end of the system 14.

In this alternative embodiment of the present invention, the same steps are performed for testing CV joints 16(1)–16(2) as described above in connection with steps 100–112 in FIG. 5, except in this embodiment, at steps 102–108, as the articulation shafts 28(1)–28(2) and cranks 26(1)–26(2) rotate, the sprocket wheels 60(1)–60(2) rotate at substantially the same velocity with respect to each other thereby balancing and absorbing the torque generated by the motor 33 at this end of the system 14. If an idler sprocket wheel 64 is used for applying tension on the chain 62, the idler sprocket wheel 64 rotates along with the sprocket wheels 60(1)–60(2).

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Further, the recited order of elements, steps or sequences, or the use of numbers, letters, or other designations therefor, is not intended to limit the claimed processes to any order except as may be explicitly specified in the claims. Accordingly, the invention is limited only by the following claims and equivalents thereto.

What is claimed is:

1. A system comprising:
   a first mount that receives a first end of a linkage;
   a torque system coupled to the first mount that applies torque to the first end of the linkage without substantially rotating the first end or a second end of the linkage;
   an articulation assembly having a second mount that receives the second end of the linkage, the articulation assembly moving the second end along a substantially circular path without substantially rotating the first or second ends of the linkage;
   a fault detection system that determines one or more conditions of the linkage based upon one or more detected signals emitted from the linkage while the first end is torqued and the second end is moved, and wherein the articulation assembly further comprises:
   a motor;
   one or more articulation shafts, at least one of the articulation shafts coupled to the motor, the motor rotating the articulation shafts;
   one or more first articulation members, each first articulation member coupled to a first end of one of the articulation shafts, the first articulation members substantially aligned along a first member plane, the first articulation members being substantially symmetrical with respect to each other;
   a second articulation member coupled at a first end to one of the first articulation members, coupled at a second end to another one of the first articulation members and coupled at a substantially center portion to the second mount, the second articulation member substantially aligned along a second member plane;
   one or more torque balancing members having a substantially circular shape, each torque balancing member coupled to one of the articulation shafts at about a second end of each articulation shaft, each torque balancing member having a substantially same diameter with respect to each other; and
   a flexible link that couples the torque balancing members together, the flexible link enabling the torque balancing members to rotate at a substantially same velocity, the torque balancing members and the flexible link substantially absorbing torque generated by the motor.

2. The system as set forth in claim 1 further comprising a base slideably seated on at least one guide track to enable the first mount to move towards or away from the first end of the linkage.

3. The system as set forth in claim 1 wherein the torque system further comprises:
   a motor having a driving shaft;
   a torquing shaft coupled to the first mount; and
   a lever member coupled to the torquing shaft at one end and pivotally coupled to the driving shaft at another end, the motor having the driving shaft moving the driving shaft to move the torquing shaft in a first and second direction for generating the torque.

4. The system as set forth in claim 1 wherein the first articulation members each have one or more connection assemblies, at least one of the connection assemblies in each first articulation member coupling the first articulation member to one of the articulation shafts, and the at least one connection assembly or at least one other connection assembly in the first articulation member coupling the first articulation member to the second articulation member.

5. The system as set forth in claim 1 wherein the first articulation members each have one or more apertures, at least one of the apertures in each first articulation member receiving one of the articulation shafts, and the at least one aperture or at least one other aperture in the first articulation member receiving a connector coupled to the second articulation member.

6. The system as set forth in claim 1 wherein the articulation assembly further comprises:
   one or more third articulation members, each third articulation member coupled to a second end of one of the articulation shafts, the third articulation members substantially aligned along a third member plane; and a fourth articulation member coupled at a first end to one of the third articulation members and at a second end to another one of the third articulation members, the fourth articulation member substantially aligned along a second member plane, the fourth articulation member substantially absorbing torque generated by the motor.

7. The system as set forth in claim 6 wherein the first member plane is substantially perpendicular with respect to the third member plane, and the second member plane is substantially parallel with respect to a base surface of the articulation assembly.

8. The system as set forth in claim 1 wherein the articulation assembly further comprises a tensioning system that engages the flexible link to keep the flexible link substantially taut.

9. The system as set forth in claim 1 wherein each torque balancing member has one or more toothlike projections extending outwardly from an outer rim and the flexible link has one or more link portions pivotally coupled together, each link portion having at least one indentation that engages one of the toothlike projections on the torque balancing member during rotation.

10. The system as set forth in claim 1 wherein the fault detection system further comprises:
  one or more signal sensors coupled to at least one joint in the linkage; and
  a signal processing system that determines whether there is a defect in the joint based upon the detected signals.

11. The system as set forth in claim 10 wherein the signal sensors comprise an accelerometer or a microphone.

12. The system as set forth in claim 1 further comprising:
  an enclosure base; and
  an enclosure system having one or more enclosure covers substantially mounted on the enclosure base, at least one of the enclosure covers having a closed position substantially sealing the enclosure system, the at least one enclosure cover or at least one other enclosure cover having an open position substantially exposing the articulation assembly, the fault detection assembly, and the first and second ends of the linkage.

13. A system for testing a linkage for defects, the system comprising:
  a first mount that receives a first end of a linkage;
  a torque system coupled to the first mount that applies torque to the first end of the linkage without substantially rotating the first end or a second end of the linkage;
  one or more first articulation members coupled to a drive mechanism, the first articulation members substantially aligned along a first member plane, the first articulation members being substantially symmetrical with respect to each other;
  a second articulation member coupled at a first end to one of the first articulation members, coupled at a second end to another one of the first articulation members and coupled at a substantially center portion to a second mount that receives the second end of the linkage, the second articulation member substantially aligned along a second member plane, the drive mechanism operating to move the second end of the linkage along a substantially circular path without substantially rotating the first or second ends of the linkage;
  a fault detection system that determines one or more conditions of the linkage based upon one or more detected signals emitted from the linkage while the first end is torqued and the second end is moved, and wherein the drive mechanism further comprises:
  a motor;
  one or more articulation shafts, at least one of the articulation shafts coupled to the motor, each articulation shaft coupled at a first end to one of the first articulation members, the motor rotating the articulation shafts;
  one or more torque balancing members having a substantially circular shape, each torque balancing member coupled to one of the articulation shafts at about a second end of each articulation shaft, each torque balancing member having a substantially same diameter with respect to each other; and
  a flexible link that couples the torque balancing members together, the flexible link enabling the torque balancing members to rotate at a substantially same velocity, the torque balancing members and the flexible link substantially absorbing torque generated by the motor.

14. The system as set forth in claim 13 wherein the first articulation members each have one or more connection assemblies, at least one of the connection assemblies in each first articulation member coupling the first articulation member to one of the articulation shafts, and the at least one connection assembly or at least one other connection assembly in the first articulation member coupling the first articulation member to the second articulation member.

15. The system as set forth in claim 13 wherein the first articulation members each have one or more apertures, at least one of the apertures in each first articulation member receiving one of the articulation shafts, and the at least one aperture or at least one other aperture in the first articulation member receiving a connector coupled to the second articulation member.

16. The system as set forth in claim 13 further comprising:
  one or more third articulation members, each third articulation member coupled to a second end of one of the articulation shafts, the third articulation members substantially aligned along a third member plane; and
  a fourth articulation member coupled at a first end to one of the third articulation members and at a second end to another one of the third articulation members, the fourth articulation member substantially aligned along the second member plane, the fourth articulation member substantially absorbing torque generated by the motor.

17. The system as set forth in claim 16 wherein the first member plane is substantially perpendicular with respect to the third member plane, and the second member plane is substantially parallel with respect to a base surface in the system.

18. The system as set forth in claim 13 wherein the articulation assembly further comprises a tensioning system that engages the flexible link to keep the flexible link substantially taut.

19. The system as set forth in claim 13 wherein each torque balancing member has one or more toothlike projections extending outwardly from an outer rim and the flexible link has one or more link portions pivotally coupled together, each link portion having at least one indentation that engages one of the toothlike projections on the torque balancing member during rotation.

20. The system as set forth in claim 13 further comprising a base slideably seated on at least one guide track to enable the first mount to move towards or away from the first end of the joint.

21. The system as set forth in claim 13 wherein the torque system further comprises:
  a motor having a driving shaft;
  a torquing shaft coupled to the first mount; and a lever member coupled to the torquing shaft at one end and pivotally coupled to the driving shaft at another end, the motor having the driving shaft moving the driving shaft to move the torquing shaft in a first and second direction for generating the torque.

22. The system as set forth in claim 13 wherein the fault detection system further comprises:

one or more signal sensors coupled to at least one joint in the linkage; and a signal processing system that determines whether there is a defect in the joint based upon the detected signals.

23. The system as set forth in claim 22 wherein the signal sensors comprise an accelerometer or a microphone.

24. The system as set forth in claim 13 further comprising:

an enclosure base; and an enclosure system having one or more enclosure covers substantially mounted on the enclosure base, at least one of the enclosure covers having a closed position substantially sealing the enclosure system, the at least one enclosure cover or at least one other enclosure cover having an open position substantially exposing the articulation assembly, the fault detection assembly, and the first and second ends of the linkage.

25. A method comprising:

receiving a first end of a linkage at a first mount;

applying torque to the first end of the linkage without substantially rotating the first end or a second end of the linkage;

receiving the second end of the linkage at a second mount;

moving the second end along a substantially circular path about a first axis without substantially rotating the first or second ends of the linkage;

determining one or more conditions of the linkage based upon one or more detected signals emitted from the linkage while the first end is torqued and the second end is moved;

wherein the moving further comprises rotating one or more first articulation members that are substantially aligned along a first member plane, are substantially symmetrical with respect to each other and are coupled to a second articulation member that is coupled at a substantially center portion to the second mount and is substantially aligned along a second member plane; and the method further comprising:

rotating one or more torque balancing members at a substantially same velocity, wherein the torque balancing members each have a substantially circular shape, are coupled to one of the articulation shafts at about a second end of each articulation shaft, have a substantially same diameter with respect to each other, and are coupled together by a flexible link to substantially absorb torque generated during rotation of the first articulation members.

26. The method as set forth in claim 25 wherein receiving the first end of the linkage further comprises moving the first mount towards or away from the first end of the joint.

27. The method as set forth in claim 25 wherein applying the torque further comprises turning the first end of the linkage back and forth between a first location and a second location about a second axis.

28. The method as set forth in claim 25 further comprising coupling each of the first articulation members to one of the articulation shafts at one or more connection assemblies in the first articulation member, and coupling the first articulation member to the second articulation member at the one or more connection assemblies or at one or more other connection assemblies to increase or decrease a circumference of the substantially circular path the second end of the linkage moves along or to change a location of the first axis the second end of the linkage moves about.

29. The method as set forth in claim 25 further comprising receiving one of the articulation shafts at one or more apertures formed in each of the first articulation members, and receiving a connector coupled to the second articulation member at the one or more apertures or at one or more other apertures in the first articulation member to increase or decrease a circumference of the substantially circular path the second end of the linkage moves along or to change a location of the first axis the second end of the linkage moves about.

30. The method as set forth in claim 25 further comprising rotating one or more third articulation members that are substantially aligned along a third member plane and are coupled to a fourth articulation member that is substantially aligned along the second member plane to substantially absorb torque generated during rotation of the first articulation members.

31. The method as set forth in claim 30 wherein the first member plane is substantially perpendicular with respect to the third member plane, and the second member plane is substantially parallel with respect to a base surface.

32. The method as set forth in claim 25 further comprising applying tension to the flexible link to keep the flexible link substantially taut.

33. The method as set forth in claim 25 further comprising detecting the signals emitted from the linkage using an accelerometer or a microphone coupled to at least one joint in the linkage.

34. The method as set forth in claim 25 further comprising substantially enclosing the first and second ends of the linkage to substantially prevent extraneous signals from interfering with the signals emitted from the linkage.

35. A method for testing a linkage for defects, the method comprising:

receiving a first end of a linkage at a first mount;

applying torque to the first end of the linkage without substantially rotating the first end or a second end of the linkage;

receiving the second end of the linkage at a second mount;

rotating one or more first articulation members that are substantially aligned along a first member plane, are substantially symmetrical with respect to each other and are coupled to a second articulation member that is coupled at a substantially center portion to the second mount and is substantially aligned along a second member plane to move the second end of the linkage along a substantially circular path about a first axis without substantially rotating the first or second ends of the linkage;

determining one or more conditions of the linkage based upon one or more detected signals emitted from the linkage while the first end is torqued and the second end is moved; and rotating one or more torque balancing members at a substantially same velocity, wherein the torque balancing members each have a substantially circular shape, are coupled to one of the articulation shafts at about a second end of each articulation shaft, have a substantially same diameter with respect to each other, and are coupled together by a flexible link to substantially absorb torque generated during rotation of the first articulation members.

36. The method as set forth in claim 35 further comprising coupling each of the first articulation members to one of one or more articulation shafts at one or more connection assemblies in the first articulation member, and coupling the first articulation member to the second articulation member at the one or more connection assemblies or at one or more other connection assemblies to increase or decrease a circumference of the substantially circular path the second end of the linkage moves along or to change a location of the first axis the second end of the linkage moves about.

37. The method as set forth in claim 35 further comprising receiving one of one or more articulation shafts at one or more apertures formed in each of the first articulation members, and receiving a connector coupled to the second articulation member at the one or more apertures or at one or more other apertures in the first articulation member to increase or decrease a circumference of the substantially circular path the second end of the linkage moves along or to change a location of the first axis the second end of the linkage moves about.

38. The method as set forth in claim 35 further comprising rotating one or more third articulation members that are substantially aligned along a third member plane and are coupled to a fourth articulation member that is substantially aligned along the second member plane to substantially absorb torque generated during rotation of the first articulation members.

39. The method as set forth in claim 38 wherein the first member plane is substantially perpendicular with respect to the third member plane, and the second member plane is substantially parallel with respect to a base surface.

40. The method as set forth in claim 35 further comprising applying tension to the flexible link to keep the flexible link substantially taut.

41. The method as set forth in claim 35 wherein receiving the first end of the linkage further comprises moving the first mount towards or away from the first end of the joint.

42. The method as set forth in claim 35 wherein applying the torque further comprises turning the first end of the linkage back and forth between a first location and a second location about a second axis.

43. The method as set forth in claim 35 further comprising detecting the signals emitted from the linkage using an accelerometer or a microphone coupled to at least one joint in the linkage.

44. The method as set forth in claim 35 further comprising substantially enclosing the first and second ends of the linkage to substantially prevent extraneous signals from interfering with the signals emitted from the linkage.

* * * * *